(12) United States Patent
Gotsis et al.

(10) Patent No.: US 12,086,084 B2
(45) Date of Patent: Sep. 10, 2024

(54) IOMMU-BASED DIRECT MEMORY ACCESS (DMA) TRACKING FOR ENABLING LIVE MIGRATION OF VIRTUAL MACHINES (VMS) USING PASSTHROUGH PHYSICAL DEVICES

(71) Applicant: VMware LLC, Palo Alto, CA (US)

(72) Inventors: Alexander Dean Gotsis, Mountain View, CA (US); Jiajun Cao, Worcester, MA (US); Radu Rugina, Sunnyvale, CA (US); James Eugene Chow, Saratoga, CA (US); Srihari Venkatesan, San Jose, CA (US); Jeffrey W. Sheldon, Los Altos, CA (US); Kalaiselvi Sengottuvel, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/578,290

(22) Filed: Jan. 18, 2022

(65) Prior Publication Data
US 2023/0229609 A1 Jul. 20, 2023

(51) Int. Cl.
*G06F 13/28* (2006.01)
*G06F 9/455* (2018.01)

(52) U.S. Cl.
CPC .......... *G06F 13/28* (2013.01); *G06F 9/45558* (2013.01); *G06F 2009/4557* (2013.01)

(58) Field of Classification Search
CPC .................. G06F 9/45558; G06F 12/109
See application file for complete search history.

(56) References Cited

U.S. PATENT DOCUMENTS

| 2013/0326515 | A1* | 12/2013 | Hara | G06F 9/45558 718/1 |
|---|---|---|---|---|
| 2015/0378783 | A1* | 12/2015 | Tarasuk-Levin | G06F 12/08 718/1 |
| 2017/0090964 | A1* | 3/2017 | Tsirkin | G06F 9/45558 |
| 2020/0192691 | A1* | 6/2020 | Jiang | G06F 12/109 |
| 2021/0342232 | A1* | 11/2021 | Gopalan | G06F 11/1451 |
| 2021/0406050 | A1* | 12/2021 | Huang | G06F 9/4856 |
| 2022/0283946 | A1* | 9/2022 | Ng | G06F 13/24 |

\* cited by examiner

*Primary Examiner* — Getente A Yimer
(74) *Attorney, Agent, or Firm* — Quarles & Brady LLP

(57) ABSTRACT

Techniques for implementing IOMMU-based DMA tracking for enabling live migration of VMs that use passthrough physical devices are provided. In one set of embodiments, these techniques leverage an IOMMU feature known as dirty bit tracking which is available in most, if not all, modern IOMMU implementations. The use of this feature allows for the tracking of passthrough DMA in a manner that is device/vendor/driver agnostic, resulting in a solution that is universally applicable to all passthrough physical devices.

18 Claims, 6 Drawing Sheets

IOMMU-BASED DIRECT MEMORY ACCESS (DMA) TRACKING FOR ENABLING LIVE MIGRATION OF VIRTUAL MACHINES (VMS) USING PASSTHROUGH PHYSICAL DEVICES

BACKGROUND

Unless otherwise indicated, the subject matter described in this section is not prior art to the claims of the present application and is not admitted as being prior art by inclusion in this section.

Device passthrough—also known as PCI passthrough in the context of Peripheral Component Interconnect (PCI) devices—is a technology that allows a virtual machine (VM) to directly access a physical device (e.g., network interface card (NIC), graphics card, storage device, hardware accelerator, etc.) without hypervisor intervention. This contrasts with traditional hypervisor-based device emulation, which requires the hypervisor to emulate the physical device using a virtual device and mediate communication between the VM and physical device via the virtual device. By removing the hypervisor as an intermediary, device passthrough reduces the latency of VM-to-physical device communications and eliminates the CPU overhead incurred for device emulation. This in turn substantially improves the performance of VM operations that require interaction with the physical device, such as network and storage input/output (I/O), graphics rendering, and so on. A physical device that is accessed via device passthrough is referred to herein as a passthrough physical device.

Due to its performance benefits, device passthrough is becoming an increasingly important and common feature in virtualized deployments. However, a drawback of this technology is that it is incompatible with live migration, which is a virtualization feature that allows a running VM to be moved from one host system to another without power cycling the VM. There are existing solutions that attempt to address this incompatibility, but they suffer from other issues that limit their applicability and usefulness.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to techniques for utilizing the input-output memory management unit (IOMMU) found in computer systems to track guest memory pages written by (or in other words, dirtied by) passthrough physical devices via direct memory access (DMA), thereby enabling the live migration of VMs that use such devices. An IOMMU is a hardware component that, among other things, performs virtual address translation of DMA requests.

As described in further detail below, certain embodiments of the present disclosure leverage an IOMMU feature known as dirty bit tracking which is available in most, if not all, modern IOMMU implementations. The use of this feature allows for the tracking of passthrough DMA in a manner that is device/vendor/driver agnostic, resulting in a solution that is universally applicable to all passthrough physical devices.

2. Example Host System and High-Level Solution Design

Figure 1:
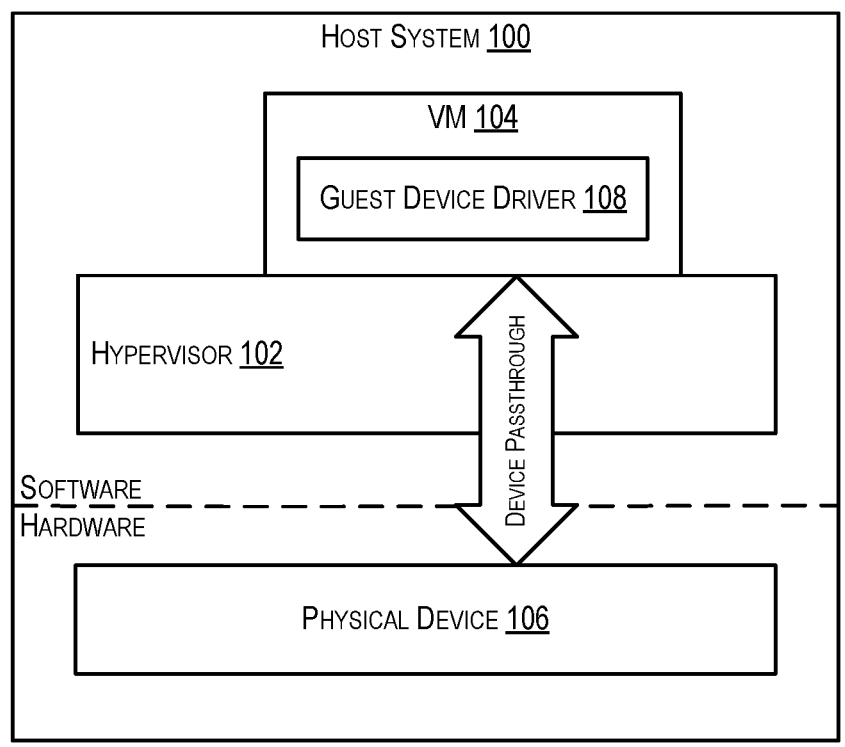
FIG. 1 depicts an example host system.

FIG. 1 is a simplified block diagram of an example host system 100 in which embodiments of the present disclosure may be implemented. As shown, host system 100 includes a virtualization software layer (i.e., hypervisor) 102 that provides an environment in which in one or more VMs, such as VM 104, can run. Host system 100 also includes a physical device 106, which may be a NIC, a storage device (e.g., magnetic or solid-state disk), a graphics card, a hardware accelerator, or any other type of peripheral device known in the art. In FIG. 1, physical device 106 is made available to VM 104 using device passthrough technology and thus is a passthrough physical device of VM 104. This means that VM 104 can directly access, via a guest device driver 108, the device-specific state of physical device 106 without hypervisor involvement (typically achieved by exposing the hardware registers of device 106 to driver 108 via memory-mapped I/O). In addition, VM 104 can directly submit, through guest device driver 108, DMA work requests to physical device 106 (e.g., I/O requests, compute requests, etc.) and in response physical device 106 can execute the DMA work requests by writing the results of the work directly into the guest memory of VM 104 via DMA writes.

As noted in the Background section, a drawback of making a physical device available to a VM via device passthrough as shown in FIG. 1 is that the VM cannot be live migrated to another (i.e., destination) host system. To understand this incompatibility, consider the typical workflow for a live migration event. During a long first phase known as the pre-copy phase, the hypervisor on the source host system copies, from the source host system to the destination host system, guest memory pages of the VM to-be-migrated while the VM is running. Because the VM is active during this phase, the source hypervisor keeps track of the guest memory pages that are dirtied by the VM as it runs and copies these pages over to the destination host system in an iterative manner (i.e., over multiple pre-copy iterations). Then, during a short, second phase known as the switch-over phase, the VM on the source host system is temporarily stunned, any remaining dirty guest memory pages (as well as the VM's current execution state) is copied over, and the VM is resumed on the destination host system.

The main issue introduced by device passthrough in this live migration workflow is that the VM is not the only entity that can write data to its guest memory during the pre-copy phase; the passthrough physical device can also write data to the VM's guest memory via DMA as explained above. The source hypervisor cannot track these DMA writes because the hypervisor is generally unaware that they are occurring. As a result, the guest memory pages that are dirtied by the passthrough physical device via DMA cannot be identified by the source hypervisor as dirty during the pre-copy phase and thus cannot be propagated to the destination host system, thereby breaking the live migration process.

One solution for this problem is to modify the passthrough physical device's guest device driver to notify the source hypervisor prior to each time VM guest memory is dirtied via passthrough DMA, or to disable passthrough mode entirely when live migration is initiated. However, this solution is not scalable because it must be implemented in the guest device driver of every potential passthrough physical device that needs live migration interoperability. Additionally, such a solution requires the establishment of a virtualization only guest to host communication channel and results in the hypervisor relying on the guest for correct migration/execution of the VM, which is not a desirable property.

Another solution is for the vendor of the passthrough physical device to provide a vendor specific interface to receive, from a host plugin/driver, information regarding which guest memory pages may have been dirtied by the device. However, this solution is imprecise because the host plugin/driver generally will not be involved in the execution of and will not have visibility into the DMAs issued/authored by the passthrough physical device and thus can only use conservative heuristics to determine which guest memory pages may be dirty. Further, like the guest driver modification approach above, this solution requires re-implementation for each potential passthrough physical device (or at least each family of devices provided by a particular vendor).

Figure 2:
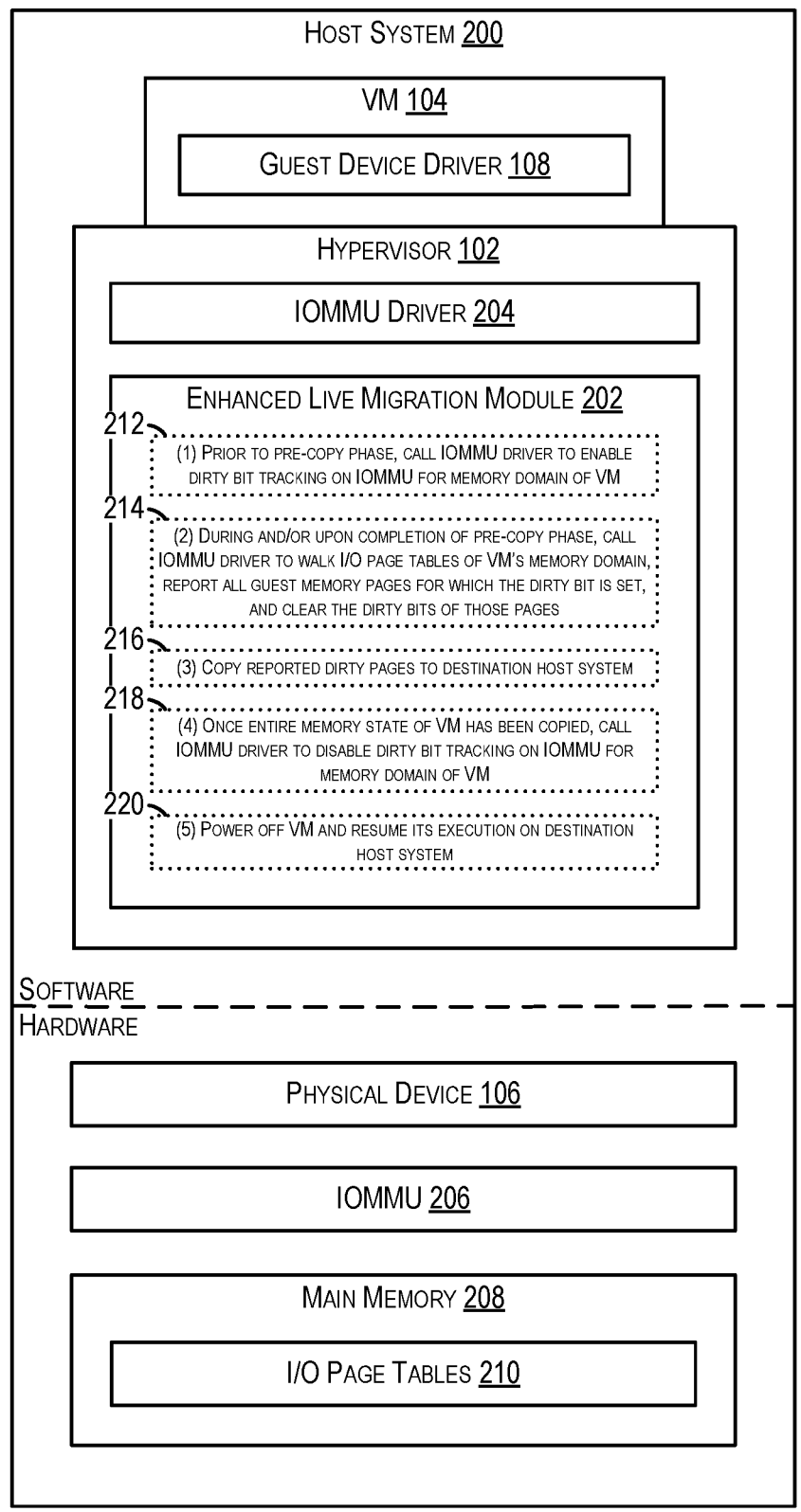
FIG. 2 depicts an enhanced version of the host system of FIG. 1 according to certain embodiments.

To address the foregoing and other similar issues, FIG. 2 depicts a modified version of host system 100 of FIG. 1 (i.e., host system 200) that includes an enhanced live migration module 202 within hypervisor 102 that is configured to carry out live migration in conjunction with an IOMMU driver 204. IOMMU driver 204 is a software component that is used by hypervisor 102 to control an IOMMU 206 of host system 200. IOMMU 206, in turn, is a hardware component (typically in the PCI root complex inside the CPU package) that translates, or in other words "re-maps," DMA requests authored by physical devices from guest physical address space to host physical address space. For example, hypervisor 102 can call IOMMU driver 204 to initialize, in a main memory 208 of host system 200, a tree-structured set of I/O page tables 210 for VM 104 upon VM power-on and program IOMMU 206 to point to the root node of the tree structure. I/O page tables 210 are associated with a domain identifier (ID) corresponding to the VM's guest physical address space (referred to as a "memory domain" or simply "domain") and are configured to hold page table entries (PTEs) comprising guest physical address (GPA) to host physical address (HPA) mappings for guest memory pages in the VM's memory domain. Then, during runtime of VM 104, physical device 106 can issue (i.e., author) DMA requests, such as DMA writes, directed to one or more guest memory pages of VM 104 by specifying one or more device virtual addresses (DVAs) corresponding to GPAs. In response, IOMMU 206 can intercept the DMA requests, translate the specified DVA(s)/GPA(s) to HPA(s) in accordance with I/O page tables 210, and execute the DMA requests against the mapped HPA(s) in host main memory 208.

As shown in FIG. 2, at the time of live migrating VM 104 from host system 200 to a destination host system, enhanced live migration module 202 can carry out a high-level workflow comprising steps (1)-(5) (reference numerals 212-220) that leverages IOMMU 206 via IOMMU driver 204 to track the guest memory pages that are dirtied by physical device 106 via DMA, thereby ensuring that the live migration can be completed successfully. In particular, at step (1), prior to initiation of the live migration pre-copy phase, enhanced live migration module 202 can call IOMMU driver 204 to enable dirty bit tracking on IOMMU 206 for the memory domain of VM 104. Dirty bit tracking is a feature supported by most modern IOMMU implementations that, when enabled for a given memory domain D, causes an IOMMU to set a dirty bit (i.e., a bit indicating dirty/modified status) in D's I/O page tables with respect to every memory page in D for which the IOMMU intercepts and processes a DMA write. Accordingly, by turning on this feature for the memory domain of VM 104 at step (1), enhanced live migration module 202 can utilize IOMMU 206 to track, in hardware, all of the guest memory pages dirtied by physical device 106 via DMA while the pre-copy phase is in progress.

At step (2), during and/or upon completion of the pre-copy phase, enhanced live migration module 202 can call IOMMU driver 204 to traverse, in host main memory 208, the I/O page tables of the memory domain of VM 104, report all of the guest memory pages in that memory domain for which the dirty bit has been set per IOMMU 206's dirty bit tracking functionality, and clear the dirty bits of those pages. Enhanced live migration module 202 can then copy the reported dirty pages over to the destination host system (step (3)).

According to one approach (referred to as the "non-iterative tracking approach" and detailed in section (3) below), enhanced live migration module 202 can execute steps (2) and (3) a single time when the pre-copy phase is complete and VM 104 has been stunned, which means that physical device 106 is no longer authoring DMA writes. This approach is relatively straightforward to implement but can extend the length of the switch-over phase (and thus, the downtime of the VM) in scenarios where physical device 106 has dirtied a large number of pages. According to another approach (referred to as the "iterative tracking approach" and detailed in section (4) below), enhanced live migration module 202 can repeat steps (2) and (3) during each pre-copy iteration and then execute these steps one final time at the end of the pre-copy phase to identify and copy over any remaining dirty pages. This approach will generally result in less switch-over time than the non-iterative tracking approach because most of the pages dirtied by physical device 106 will have been copied over during the pre-copy iterations. However, this approach is more complex to implement because physical device 106 is active and may author DMA requests while the I/O page tables are being traversed, which can be problematic in certain scenarios (discussed in section (4) below).

Once the entire memory and execution states of VM 104 (including the guest memory pages dirtied by physical device 106) have been transferred to the destination host system, enhanced live migration module 202 can call IOMMU driver 204 to disable dirty bit tracking for the memory domain of VM 104 and clear all dirty bits in the domain's I/O page tables (step (4)). Finally, at step (5), enhanced live migration module 202 can power off VM 104 on host system 102 and resume execution of the VM on the destination host system.

With the high-level solution shown in FIG. 2 and described above, several advantages are achieved. First, because the dirty bit tracking performed by IOMMU 206 applies to all DMA writes authored by all physical devices, there is no need to implement different code paths/drivers for specific device models or vendor families of devices.

Accordingly, this solution is device/vendor/driver agnostic and applicable to all passthrough physical devices that may be used by VM 104, either available now or developed in the future. Second, because this solution relies on a hardware-based tracking mechanism, it is significantly more performant than software-based solutions.

The remaining sections of this disclosure provide details for implementing the iterative and non-iterative tracking approaches mentioned above, as well as certain optimizations/extensions pertaining to the dynamic resizing of memory pages in the I/O page tables of VM 104 at the time of live migration (which can reduce the total amount of data transferred to the destination host system) and support for virtual IOMMUs. It should be appreciated that FIGS. 1 and 2 are illustrative and not intended to limit embodiments of the present disclosure. For example, the various entities shown in these figures may be organized according to different arrangements/configurations or may include subcomponents or functions that are not specifically described. One of ordinary skill in the art will recognize other variations, modifications, and alternatives.

3. Non-Iterative Tracking

Figure 3:
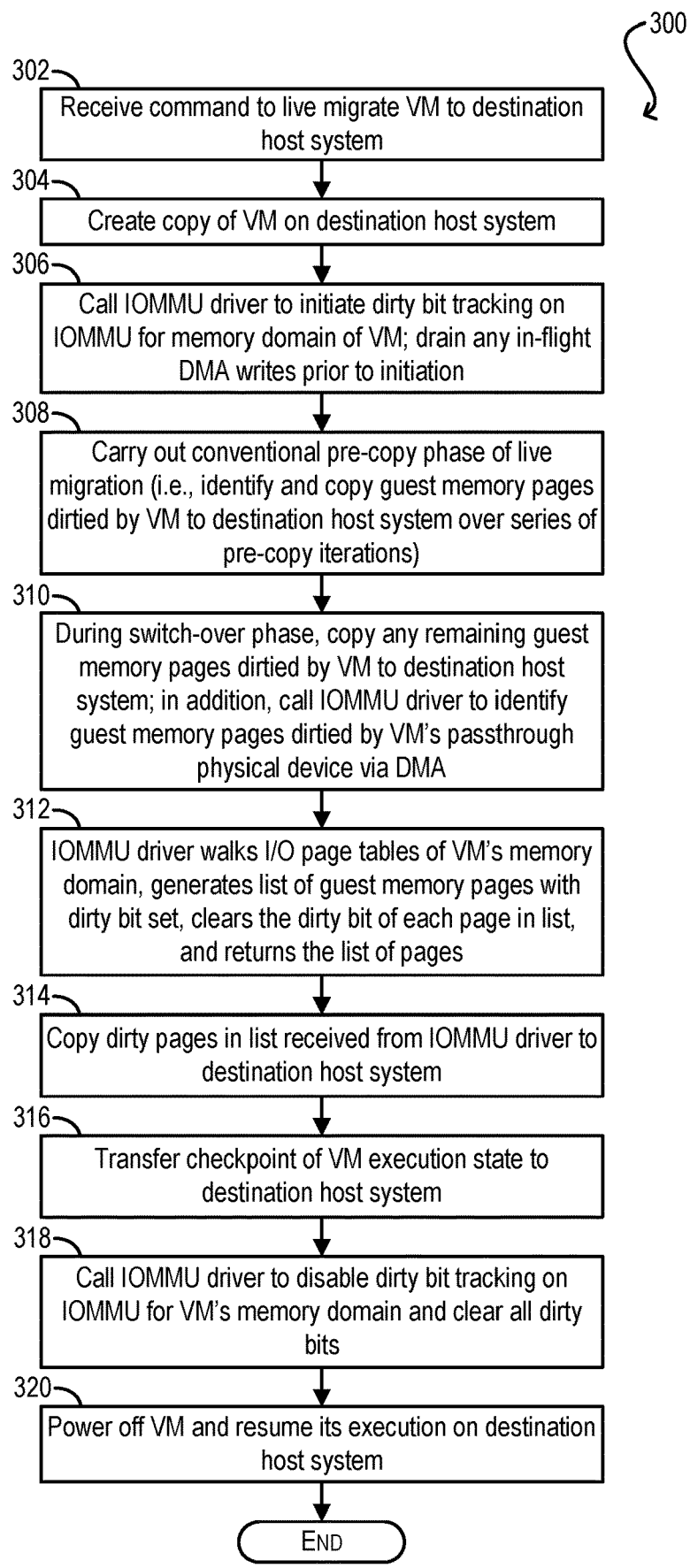
FIG. 3 depicts a workflow for performing IOMMU-based non-iterative tracking of DMA writes during live migration according to certain embodiments.

FIG. 3 depicts a flowchart 300 that may be executed by enhanced live migration module 202 of FIG. 2 for tracking, during the live migration of VM 104, guest memory pages of the VM dirtied by physical device 106 via DMA using the non-iterative tracking approach according to certain embodiments.

Starting with block 302, hypervisor 102 of host system 200 can receive (from, e.g., a virtual infrastructure management server) a command to live migrate VM 104 from host system 200 to a destination host system. In response, a copy of VM 104 can be created on the destination host system (block 304) and enhanced live migration module 202 can call IOMMU driver 204 to enable/initiate, on IOMMU 206, dirty bit tracking for the memory domain (i.e., guest physical address space) of VM 104 (block 306). As part of block 306, module 202 or IOMMU driver 204 can ensure that all in-flight DMA writes (i.e., DMA writes issued by physical device 106 and intercepted by IOMMU 206 but not yet written to main memory 208) are completed before the tracking is enabled. This process, known as draining writes, avoids scenarios in which such in-flight DMA writes are not correctly tracked.

At block 308, enhanced live migration module 202 can carry out the conventional pre-copy phase of the live migration process, which proceeds over a series of pre-copy iterations. In each pre-copy iteration, module 202 can identify guest memory pages of VM 104 that have been modified by the VM since the last iteration and can transfer those memory pages to the destination host system. Once the amount of dirty guest memory pages remaining on host system 200 has fallen below a threshold, module 202 can stun VM 104 (thereby marking the end of the pre-copy phase and the start of the switch-over phase).

At block 310, during the switch-over phase, enhanced live migration module 202 can copy the remaining guest memory pages dirtied by the VM to the destination host system. Significantly, module 202 can also invoke IOMMU driver 204 at this point in order to identify all of the guest memory pages of VM 104 dirtied by physical device 106 via DMA. In response, IOMMU driver 204 can traverse (i.e., walk) through the I/O page tables for the memory domain of VM 104, generate a list of guest memory pages with the dirty bit set, clear the dirty bit of each page in the list, and return the list of pages to module 202 (block 312).

At block 314, enhanced live migration module 202 can copy the dirty pages included in the list received from IOMMU driver 204 to the destination host system, thereby ensuring that all of the data written by physical device 106 since the start of the live migration is propagated there. Finally, at blocks 316-320, enhanced live migration module 202 can transfer a checkpoint of VM 104's execution state to the destination host system, call IOMMU driver 204 to disable dirty bit tracking for VM 104's memory domain and clear all remaining dirty bits (which is useful if the live migration fails and is retried/restarted), power off VM 104 on host system 200, and resume execution of the VM on the destination host system.

4. Iterative Tracking

Figure 4:
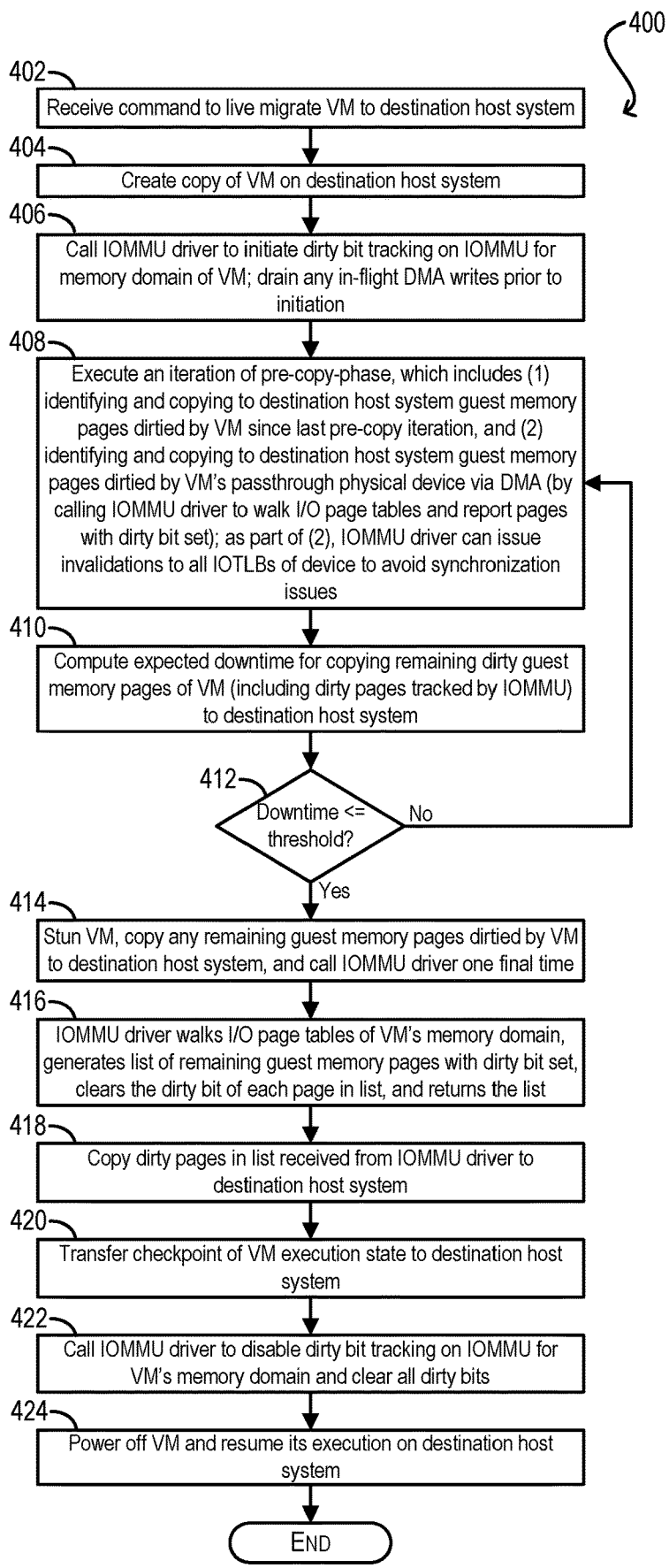
FIG. 4 depicts a workflow for performing IOMMU-based iterative tracking of DMA writes during live migration according to certain embodiments.

FIG. 4 depicts a flowchart 400 that may be executed by enhanced live migration module 202 of FIG. 2 for tracking, during the live migration of VM 104, guest memory pages of the VM dirtied by physical device 106 via DMA using the iterative tracking approach according to certain embodiments. As mentioned previously, this iterative approach can result in faster switch-over time than the non-iterative approach but is more complex to implement due to potential synchronization issues. For example, if physical device 106 employs a feature known as address translation services (ATS) which involves caching, on the device side, GPA-to-HPA translations provided by IOMMU 206, it is possible for the device to author certain DMA writes (via the cached translations) that are not processed by IOMMU 206. This means that physical device 106 can dirty guest memory pages without further notifying the IOMMU 206 and setting the dirty bit for the guest memory pages written via those DMA writes. If the IOMMU page table dirty bits have been cleared without invalidating the device IOTLBs, this will result in incorrect tracking and migration failure. Flowchart 400 includes mechanisms for dealing with these issues.

Blocks 402-406 of flowchart 400 are largely similar to blocks 302-306 of flowchart 300; in particular, hypervisor 102/enhanced live migration module 202 can receive a command to live migrate VM 104 from host system 200 to a destination host system, create a copy of VM 104 on the destination host system, and call IOMMU driver 204 to enable/initiate, on IOMMU 206, dirty bit tracking for the memory domain of VM 104. As with the non-iterative approach, module 202 or IOMMU driver 204 can drain in-flight DMA writes prior to enabling dirty bit tracking at block 406.

At block 408, enhanced live migration module 202 can execute an iteration of the pre-copy phase, which includes two distinct steps in this workflow: (1) identifying and transferring to the destination host system guest memory pages dirtied by the VM since the last pre-copy iteration, and (2) identifying and transferring to the destination host system guest memory pages dirtied by physical device 106 via DMA since the last pre-copy iteration. To carry out (2), enhanced live migration module 202 can call IOMMU driver 204, which can walk the I/O page tables of the memory domain of VM 104, generate a list of guest memory pages with the dirty bit set, clear the dirty bit of each page in the list, and return the list of pages to module 202. IOMMU driver 204 can also issue invalidations to all of the IO translation look aside buffers (known as IOTLBs) used by physical device 106 as part of this processing, which will invalidate any GPA-to-HPA mappings cached by device 106 in those IOTLBs and thus avoid the synchronization problem mentioned earlier with respect to ATS.

Upon completing the pre-copy iteration, enhanced live migration module 202 can compute the expected downtime for copying the remaining dirty guest memory pages of VM 104 (including dirty pages tracked by IOMMU 206) to the destination host system (block 410) and can check whether this downtime is less than or equal to a threshold (block 412). If the answer is no, module 202 can return to block 408 and execute the next pre-copy iteration.

However, if the answer at block 412 is yes (which means that the expected downtime is acceptable), enhanced live migration module 202 can stun VM 104, copy the remaining guest memory pages dirtied by the VM to the destination host system, and call IOMMU driver 204 one last time (block 414). In response, IOMMU driver 204 can walk the I/O page tables to generate a list of remaining guest memory pages dirtied by physical device 106, clear the dirty bit of each page in the list, and return the list of pages to module 202 (block 416).

At block 418, enhanced live migration module 202 can copy the dirty pages included in the list received from IOMMU driver 204 at block 414 to the destination host system. Finally, at blocks 420-424, enhanced live migration module 202 can transfer a checkpoint of VM 104's execution state to the destination host system, call IOMMU driver 204 to disable dirty bit tracking for VM 104's memory domain and clear all remaining dirty bits, power off VM 104 on host system 200, and resume execution of the VM on the destination host system, thereby completing the live migration.

5. Dynamic Page Resizing

When VM 104 is powered on and hypervisor 102 creates I/O page tables for the VM's memory domain for use by IOMMU 206, the hypervisor specifies one or more sizes for the memory pages mapped with respect to that domain (and thus, the page granularity that can be tracked/translated by IOMMU 206). This memory page size will typically range from 4 kilobytes (KB) to several gigabytes (GB). Generally speaking, a larger page size is preferable for normal VM operation because this results in fewer PTEs in the I/O page tables (which means less host main memory consumption) and faster management/updating of those page tables. However, during a live migration event, a smaller page size is preferable because this allows for greater precision in tracking the data that is marked as dirtied by IOMMU 206 and thus a reduction in the total amount of data that is transferred over to the destination host system. For example, assume the page size for VM 104's memory domain is set at 2 GB and a single byte of a given page is modified by physical device 106 via DMA during the pre-copy phase. In this scenario, the entire 2 GB page will be marked as dirty and copied to the destination, even if the vast majority of the page content is not dirty. In contrast, if the page size is set at 4 KB, only a single 4 KB page will be marked as dirty and copied over.

To exploit the foregoing, in certain embodiments enhanced live migration module 202 can dynamically reduce the memory page size(s) for the memory domain of VM 104 in its I/O page tables upon/while live migrating the VM, thereby allowing for a larger page size during normal VM operation and a smaller page size at the time of live migration. In one set of embodiments, enhanced live migration module 202 can implement this dynamic page resizing in an "eager" manner that simply involves applying the reduction to all of the pages in the VM's I/O page tables at the start of the live migration process (e.g., splitting all 2 GB pages into 4 KB pages). This eager method can be implemented with respect to either the non-iterative tracking approach or the iterative tracking approach described above.

Figure 5:
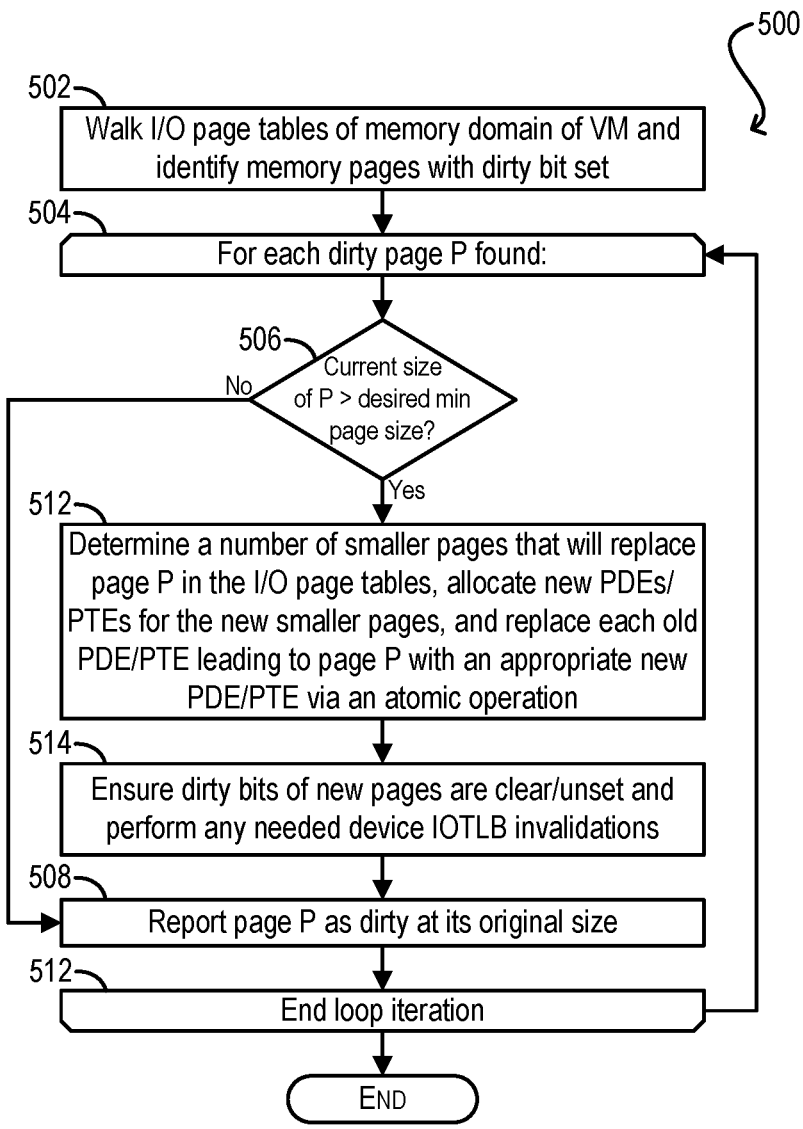
FIG. 5 depicts a workflow for performing lazy dynamic page resizing in conjunction with the workflow of FIG. 4 according to certain embodiments.

In another set of embodiments, enhanced live migration module 202 can implement dynamic page resizing in a "lazy" fashion that involves splitting memory pages into smaller sizes as they are identified as being dirty. This lazy method, which assumes per the principles of temporal and spatial locality that a memory page which is dirtied once will likely be dirtied again, can be implemented with respect to the iterative tracking approach and is illustrated via flowchart 500 of FIG. 5. The implementation shown in FIG. 5 specifically discloses steps that can be performed by IOMMU driver 204 at the time it is called by enhanced live migration module 202 during a pre-copy iteration (i.e., at block 408 of FIG. 4) to report guest memory pages dirtied by physical device 106.

Starting with blocks 502 and 504, IOMMU driver 204 can walk the I/O page tables of the memory domain of VM 104 and enter a loop for each dirty page P that is found. Within this loop, IOMMU driver 204 can check whether the current page size of P is greater than a desired minimum page size (block 506). If the answer is no, IOMMU driver can report page P as dirty at its current size (block 508) and reach the end of the current loop iteration (block 510).

However, if the answer at block 506 is no (indicating that page P should be split into smaller pages), IOMMU driver 204 can determine a number of smaller memory pages that will replace P in the I/O page tables, allocate and populate new page directory entries (PDEs) and/or PTEs for the new smaller pages, and replace each old PDE/PTE in the I/O page tables leading to P with an appropriate new PDE/PTE (block 512). These new PDEs/PTEs encode the same GPA-to-HPA mapping function as the old PDEs/PTEs, just with one or more additional page table levels and thus a finer page granularity. In various embodiments. IOMMU driver 204 can perform each final replacement operation at block 512 as an atomic write.

At block 514, IOMMU driver 204 can ensure that the dirty bits for the new smaller pages are clear/unset, as well as perform any needed device IOTLB invalidations. Finally, IOMMU driver 204 can report page P is dirty at its original (pre-split) size (block 508) and reach the end of the current loop iteration (block 510). Now additional writes to the original page P will be reported at the finer page granularity. Once all of the dirty pages are processed, flowchart 500 can end.

6. Virtual IOMMU Support

In some embodiments, VM 104 may make use of a virtual IOMMU that is separate from physical IOMMU 206 of host system 200. There are generally three ways in which such a virtual IOMMU may be implemented: (1) via software emulation (referred to as an emulated or "caching mode" virtual IOMMU), (2) by leveraging the 2-level (i.e., nested) translation feature of physical IOMMU 206, and (3) by leveraging certain hardware-supported features of physical IOMMU 206. Implementations (2) and (3) are compatible with the non-iterative and iterative tracking approaches described in the foregoing sections and thus no particular changes are needed in order to support these virtual IOMMU implementations.

However, additional hypervisor-level logic is needed to allow implementation (1) (i.e., caching mode virtual IOMMU) to be used in conjunction with the IOMMU-based DMA tracking techniques of the present disclosure. This additional logic is illustrated via flowcharts 600 and 700 of FIGS. 6 and 7 according to certain embodiments. In particular, flowchart 600 depicts steps that can be performed by IOMMU driver 204 of host system 200 to create a "back mapping" from an HPA x" to a GPA x' at the time VM 104 maps an I/O address (i.e., device virtual address or DVA) x to GPA x' via its virtual IOMMU, and flowchart 700 depicts steps that can be performed by IOMMU driver 204 to reference this back mapping and retrieve GPA x' from HPA x" at the time VM 104 un-maps DVA x via its virtual IOMMU (as well as when GPA x' needs to be reported as dirty during live migration). This ensures that IOMMU driver 204 can lookup and correctly report GPA x' to enhanced live migration module 202 during the live migration process if corresponding HPA x" is marked as dirty.

Starting with block 602 of flowchart 600, VM 104 can map DVA x to GPA x' on its virtual IOMMU and issue a callback (e.g., an IOMMU cache flush) that is intercepted by hypervisor 102.

At block 604, IOMMU driver 204 of hypervisor 102 can determine an HPA x" for GPA x' and can map DVA x to HPA x" on physical IOMMU 206. IOMMU driver 204 can then create a back mapping from HPA x" to GPA x' in a hypervisor-level "back map" data structure (block 606) and flowchart 600 can end.

Turning now to flowchart 700, at block 702, VM 104 can un-map DVA x from GPA x' on its virtual IOMMU and issue a callback (e.g., an IOMMU cache flush) that is intercepted by hypervisor 102.

At block 704, IOMMU driver 204 can check whether dirty bit tracking is enabled on physical IOMMU 206 with respect to the memory domain of VM 104 and whether the memory page corresponding to DVA x/HPA x" is dirty. If the answer is yes, IOMMU driver 204 can use the back mapping created at block 606 of flowchart 600 to lookup GPA x' from HPA x" and report GPA x' as dirty (block 706). Note that IOMMU driver 204 can also perform this lookup as part of the dirty page reporting of blocks 312 and 408 of flowcharts 300 and 400 respectively for each dirty HPA x".

At block 708, IOMMU driver 204 can un-map DVA x from HPA x" on physical IOMMU 206 as requested by the VM. Finally, at block 710, IOMMU driver 204 remove the back mapping of HPA x" to GPA x' from the back map data structure and flowchart 700 can end.

Figure 6:
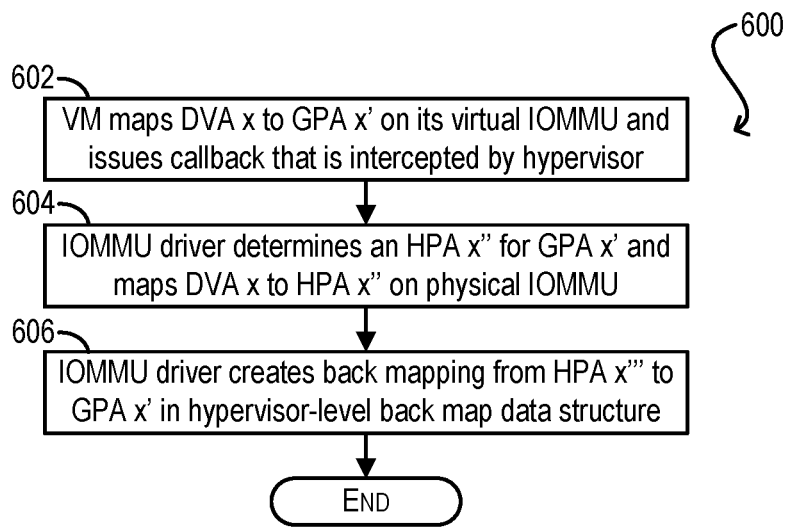
FIGS. 6 and 7 depict workflows for supporting caching mode virtual IOMMU according to certain embodiments.
Figure 7:
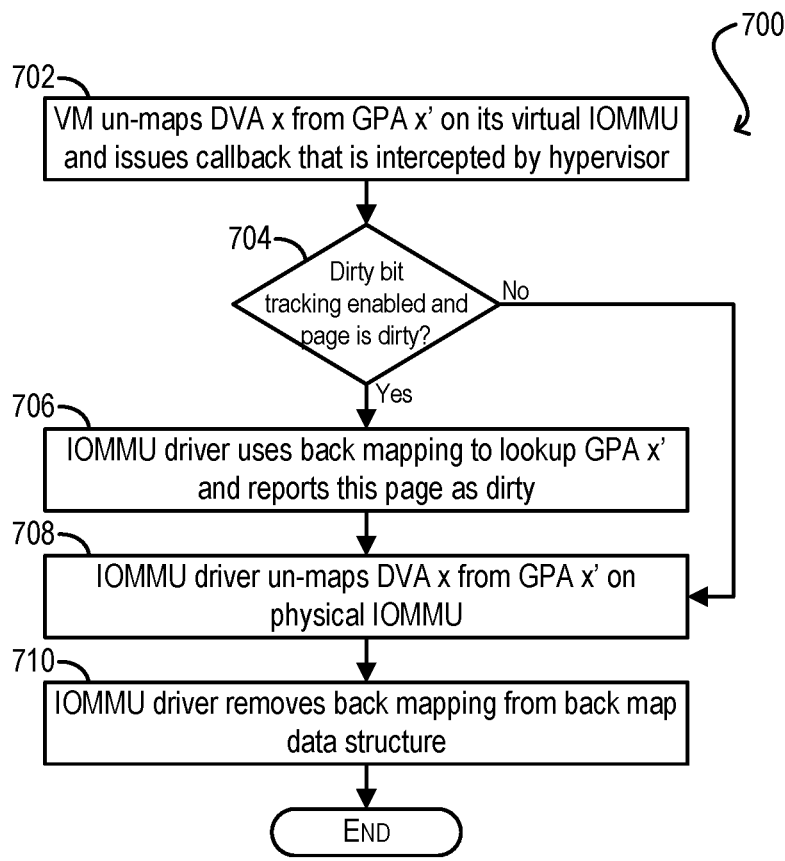

It should be noted that FIGS. 6 and 7 illustrate only one possible approach for supporting caching mode virtual IOMMU in the context of the IOMMU-based tracking techniques of the present disclosure and other approaches are feasible. For example, according to one alternative approach, IOMMU driver 204 can refrain from creating the back mapping of HPA x" to GPA x' and instead simply search the I/O page tables of VM 104 for a GPA mapped to HPA x" at the time of performing dirty page reporting. This alternative approach saves on host main memory by eliminating the hypervisor-level back map data structure but can result in worse performance (due to the need to search the I/O page tables for each dirty page).

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising, at a time of performing a live migration of a virtual machine (VM) that uses a passthrough physical device from a host system to a destination host system:
    prior to initiating a pre-copy phase of the live migration, enabling, by a hypervisor of the host system, dirty bit tracking on an input-output memory management unit (IOMMU) of the host system for a memory domain of the VM, wherein the dirty bit tracking causes the IOMMU to, in response to direct memory access writes from the passthrough physical device, set, in one or more input/output (I/O) page tables associated with the memory domain, a dirty bit for each guest memory page in the memory domain dirtied by the passthrough physical device via direct memory access (DMA); and
    upon completion of the pre-copy phase:
        identifying, in the I/O page tables, one or more guest memory pages with the dirty bit set; and
        copying the one or more guest memory pages to the destination host system;
    wherein the VM includes an emulated virtual IOMMU and wherein the identifying comprises, for a guest memory page associated with a host physical address that is determined to be dirty, performing a lookup for a quest physical address of the guest memory page from the host physical address.

2. The method of claim 1 further comprising, subsequently to the identifying:
    clearing the dirty bit for each of the one or more guest memory pages.

3. The method of claim 1 further comprising, once the one or more guest memory pages have been copied:
    disabling the dirty bit tracking on the IOMMU for the memory domain of the VM.

4. The method of claim 1 further comprising:
    performing the identifying and the copying in each of a plurality of pre-copy iterations of the pre-copy phase.

5. The method of claim 4 further comprising:
    issuing invalidations for one or more I/O translation lookaside buffers of the passthrough physical device in each of the plurality of pre-copy iterations.

6. The method of claim 4 further comprising, during each pre-copy iteration:
    dynamically splitting, in the I/O pages tables, dirty guest memory pages that are larger than a predefined size into one or more smaller pages.

7. A non-transitory computer readable storage medium having stored thereon program code executable by a hypervisor of a host system, the program code embodying a method that is executed at a time of performing a live migration of a virtual machine (VM) that uses a passthrough physical device from the host system to a destination host system, the method comprising:
    prior to initiating a pre-copy phase of the live migration, enabling dirty bit tracking on an input-output memory management unit (IOMMU) of the host system for a memory domain of the VM, wherein the dirty bit tracking causes the IOMMU to, in response to direct memory access writes from the passthrough physical device, set, in one or more input/output (I/O) page tables associated with the memory domain, a dirty bit for each guest memory page in the memory domain dirtied by the passthrough physical device via direct memory access (DMA); and
    upon completion of the pre-copy phase:
        identifying, in the I/O page tables, one or more guest memory pages with the dirty bit set; and
        copying the one or more guest memory pages to the destination host system;
    wherein the VM includes an emulated virtual IOMMU and wherein the identifying comprises, for a guest memory page associated with a host physical address that is determined to be dirty, performing a lookup for a guest physical address of the guest memory page from the host physical address.

8. The non-transitory computer readable storage medium of claim 7 wherein the method further comprises, subsequently to the identifying:
    clearing the dirty bit for each of the one or more guest memory pages.

9. The non-transitory computer readable storage medium of claim 7 wherein the method further comprises, once the one or more guest memory pages have been copied:
    disabling the dirty bit tracking on the IOMMU for the memory domain of the VM.

10. The non-transitory computer readable storage medium of claim 7 wherein the method further comprises:
    performing the identifying and the copying in each of a plurality of pre-copy iterations of the pre-copy phase.

11. The non-transitory computer readable storage medium of claim 10 wherein the method further comprises:

issuing invalidations for one or more I/O translation lookaside buffers of the passthrough physical device in each of the plurality of pre-copy iterations.

12. The non-transitory computer readable storage medium of claim 10 wherein the method further comprises, during each pre-copy iteration:
dynamically splitting, in the I/O pages tables, dirty guest memory pages that are larger than a predefined size into one or more smaller pages.

13. A host system comprising:
a hypervisor;
an input-output memory management unit (IOMMU);
a passthrough physical device; and
a non-transitory computer readable medium having stored thereon program code that causes the hypervisor to, at a time of performing a live migration of a virtual machine (VM) that uses the passthrough physical device from the host system to a destination host system:
prior to initiating a pre-copy phase of the live migration, enable dirty bit tracking on the IOMMU for a memory domain of the VM, wherein the dirty bit tracking causes the IOMMU to, in response to direct memory access writes from the passthrough physical device, set, in one or more input/output (I/O) page tables associated with the memory domain, a dirty bit for each guest memory page in the memory domain dirtied by the passthrough physical device via direct memory access (DMA); and
upon completion of the pre-copy phase:
identify, in the I/O page tables, one or more guest memory pages with the dirty bit set; and
copy the one or more guest memory pages to the destination host system;
wherein the VM includes an emulated virtual IOMMU and wherein the identifying comprises, for a guest memory page associated with a host physical address that is determined to be dirty, performing a lookup for a guest physical address of the quest memory page from the host physical address.

14. The host system of claim 13 wherein the program code further causes the hypervisor to, subsequently to the identifying:
clear the dirty bit for each of the one or more guest memory pages.

15. The host system of claim 13 wherein the program code further causes the hypervisor to, once the one or more guest memory pages have been copied:
disable the dirty bit tracking on the IOMMU for the memory domain of the VM.

16. The host system of claim 13 wherein the program code further causes the hypervisor to:
perform the identifying and the copying in each of a plurality of pre-copy iterations of the pre-copy phase.

17. The host system of claim 16 wherein the program code further causes the hypervisor to:
issue invalidations for one or more I/O translation lookaside buffers of the passthrough physical device in each of the plurality of pre-copy iterations.

18. The host system of claim 16 wherein the program code further causes the hypervisor to, during each pre-copy iteration:
dynamically split, in the I/O pages tables, dirty guest memory pages that are larger than a predefined size into one or more smaller pages.

* * * * *